United States Patent
Schmedding et al.

(10) Patent No.: US 6,532,406 B1
(45) Date of Patent: Mar. 11, 2003

(54) VEHICLE COMPUTER SYSTEM

(75) Inventors: Rainer Schmedding, Dickholzen (DE); Andreas Westendorf, Hildesheim (DE); Wolfgang Baierl, Remshalden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/786,478

(22) PCT Filed: May 27, 1999

(86) PCT No.: PCT/DE99/01551
§ 371 (c)(1),
(2), (4) Date: May 25, 2001

(87) PCT Pub. No.: WO00/14926
PCT Pub. Date: Mar. 16, 2000

(30) Foreign Application Priority Data

Sep. 4, 1998 (DE) .......................................... 198 40 484

(51) Int. Cl.$^7$ ........................ G05B 19/42; G06F 19/00; G06F 11/30
(52) U.S. Cl. .............................. 701/29; 701/35; 700/2; 700/4
(58) Field of Search ............................ 701/29, 35, 36, 701/33, 102, 115; 703/8, 21; 700/2, 4, 20, 24; 455/3.06

(56) References Cited

U.S. PATENT DOCUMENTS

| | | | | |
|---|---|---|---|---|
| 4,584,487 A | * | 4/1986 | Hesse et al. .............. 307/10 R |
| 4,751,633 A | * | 6/1988 | Henn et al. ................. 364/200 |
| 4,881,227 A | * | 11/1989 | Bühren ........................... 371/9 |
| 4,945,486 A | * | 7/1990 | Nitschke et al. ....... 364/431.11 |
| 5,586,034 A | * | 12/1996 | Takaba et al. ......... 364/431.04 |
| 5,588,720 A | * | 12/1996 | Mattern ................. 303/122.08 |
| 5,794,164 A | * | 8/1998 | Beck et al. .................... 701/1 |
| 6,104,971 A | * | 8/2000 | Fackler ......................... 701/36 |
| 6,192,331 B1 | * | 2/2001 | Gaessler et al. .............. 703/22 |
| 6,208,926 B1 | * | 3/2001 | Wagner et al. ................ 701/70 |

FOREIGN PATENT DOCUMENTS

| | | |
|---|---|---|
| DE | 35 43 996 | 6/1987 |
| EP | 0 517 534 | 12/1992 |
| WO | WO 97/19833 | 6/1997 |

* cited by examiner

*Primary Examiner*—Tan Q. Nguyen
*Assistant Examiner*—Dalena Tran
(74) *Attorney, Agent, or Firm*—Kenyon & Kenyon

(57) ABSTRACT

A vehicle computer arrangement, particularly for a motor vehicle, a train, an airplane or a ship, which is provided with at least two computers (10, 20) and at least one data bus (60) via which the at least two computers (10, 20) are interconnected, and in which at least one monitoring circuit (40) is arranged between a first computer (10) and a second computer (20) of the at least two computers, the monitoring circuit checking whether a data exchange between the first and the second computer is permitted for data processed or to be processed in the first or the second computer, and blocking the data exchange in the event that it is not permitted for the monitored data.

15 Claims, 1 Drawing Sheet

VEHICLE COMPUTER SYSTEM

FIELD OF THE INVENTION

The present invention is based on a vehicle computer arrangement, particularly for a motor vehicle, a train, an airplane or ship, having at least two computers and at least one data bus, via which the at least two computers are interconnected.

BACKGROUND INFORMATION

Modern vehicles, particularly motor vehicles, are generally equipped with a plurality of electronic systems, i.e. an audio-signal system and a safety system, functioning independently of one another. The audio-signal system generally includes an AM/FM broadcast receiver, a compact cassette (CC) or a compact disk (CD) player, a tone controller, for example, in the form of an equalizer, an amplifier and loudspeakers. The broadcast receiver and the CC or CD player, and often the equalizer as well, are accommodated together in a common housing provided for installation in the dashboard of a motor vehicle, the housing being standardized with respect to its size, thus ensuring that the audio system can be installed in at least a majority of motor-vehicle dashboards.

The safety system mentioned generally functions completely independently of the audio system. The safety system is usually made up of a plurality of sensors distributed over the motor vehicle, and a central, application-specific, integrated circuit (ASIC) for recording the sensor signals and possibly for triggering safety-relevant functions. In addition, the safety system controls actuators, for example, for opening and closing the doors or windows, and, for instance, an alarm system.

In addition, the newest motor vehicles are also provided with a diagnostic system which monitors the functioning of the motor-vehicle engine, the power transfer, the fuel system and possibly further components. The diagnostic system can be connected to an external computer, so that the recorded diagnostic information can be read out from the computer of the diagnostic system and evaluated, e.g. for repairing a vehicle. Moreover, the diagnostic system also includes display devices, integrated into the dashboard, which inform the motor-vehicle driver about the operating state of the vehicle.

In the same way, various modern motor vehicles are provided with navigation systems which, from sensors located on the vehicle, e.g. a compass, an odometer, as well as the output signals of a GPS (Global Positioning System) receiver, determine the current vehicle position, and by comparing the current vehicle position to an electronically stored map, with the aid of a start position and destination position specified by the motor-vehicle driver, generate navigation information for guiding the motor-vehicle driver.

In addition, motor vehicles are often also equipped with communication systems, e.g. in the form of mobile telephones. Particularly well-developed systems are voice-controlled, and thus allow the motor-vehicle driver to initiate or receive telephone calls while traveling, without at the same time having to remove a hand from the steering wheel or being otherwise distracted from the traffic situation.

Each of the described systems is provided with its own special processor or ASIC for processing the special software necessary for the devices. If, at this point, a motor-vehicle owner would like to retrofit one of the described systems in his motor vehicle, he/she is forced to acquire and install a complete system, including the special processor necessary for the system, in the vehicle.

A computer system for a vehicle, particularly a motor vehicle, is known from WO 97/19833, in which the various above-described, independent components are integrated, and which is provided with an open hardware architecture and a shared operating system for the various components, thus making it possible to retrofit one of the above-indicated or further components by connection to the existing computer arrangement.

The German Patent DE 35 43 996 C2 describes a multi-computer arrangement for a vehicle, particularly a motor vehicle, in which the various computers are interconnected for the purpose of exchanging information. Different, suitably characterized, permanently stored data records are stored in write-read memories allocated to the various computers to permit, for example, the user to subsequently adapt the program flows to be processed in the computers. Using a freely programmable memory, it is possible to access the stored data records at the beginning of the computer operation by inputting corresponding identifiers, and thus to adapt the program flows for the computers.

SUMMARY OF THE INVENTION

The vehicle computer arrangement of the present invention has the advantage that the demands for system stability and safety are met, accompanied at the same time by an increase in flexibility when equipping or retrofitting a vehicle fitted with the vehicle computer arrangement with various further applications. To that end, the vehicle computer arrangement is provided with a monitoring circuit which ensures that access to safety-critical operating-program components or components of the computer arrangement is enabled only for an authorized group of people, e.g. the motor-vehicle manufacturer. Thus, the safety demands of the motor-vehicle manufacturers, who, in view of threatening warranty claims, have an interest in the integrity of the operating programs specified by them, are fulfilled. An uncontrolled access to sensitive areas of the vehicle computer arrangement or of the operating programs is therefore effectively ruled out.

Along the lines of a cost reduction, it is particularly advantageous if at least one of the computers of the vehicle computer arrangement is a standard personal computer, and a standard operating system is used for the communication between the computer(s) and further components connected to the computers. Underlying this is the consideration that standard personal computers are produced in much greater quantity than, for example, special computers tailored to specific applications such as those of a vehicle navigation system or of an engine management. Since the production costs are far less crucial for standard personal computers because of their much larger production numbers compared to special computers, a considerably lower production cost results for vehicle computer arrangements based on standard personal computers. The situation is the same with the operating systems used for the communication of the computers among themselves or with the further connected components; falling back on standard operating systems makes it possible to dispense with a time-consuming and therefore costly new development of special operating systems.

In addition, the use of standard operating systems for the computers of the vehicle computer arrangement has the advantage that a widespread and generally accepted standard for data exchange is available for further components that are subsequently connectible to the vehicle computer arrangement. Thus, the need to adapt further connectible components to various operating systems is eliminated, as well as the associated additional costs.

BRIEF DESCRIPTION OF THE DRAWING

The FIGURE shows a vehicle computer arrangement according to the present invention having computers that are interconnected via data buses, further components being connected to the data buses.

DETAILED DESCRIPTION

Figure 1:
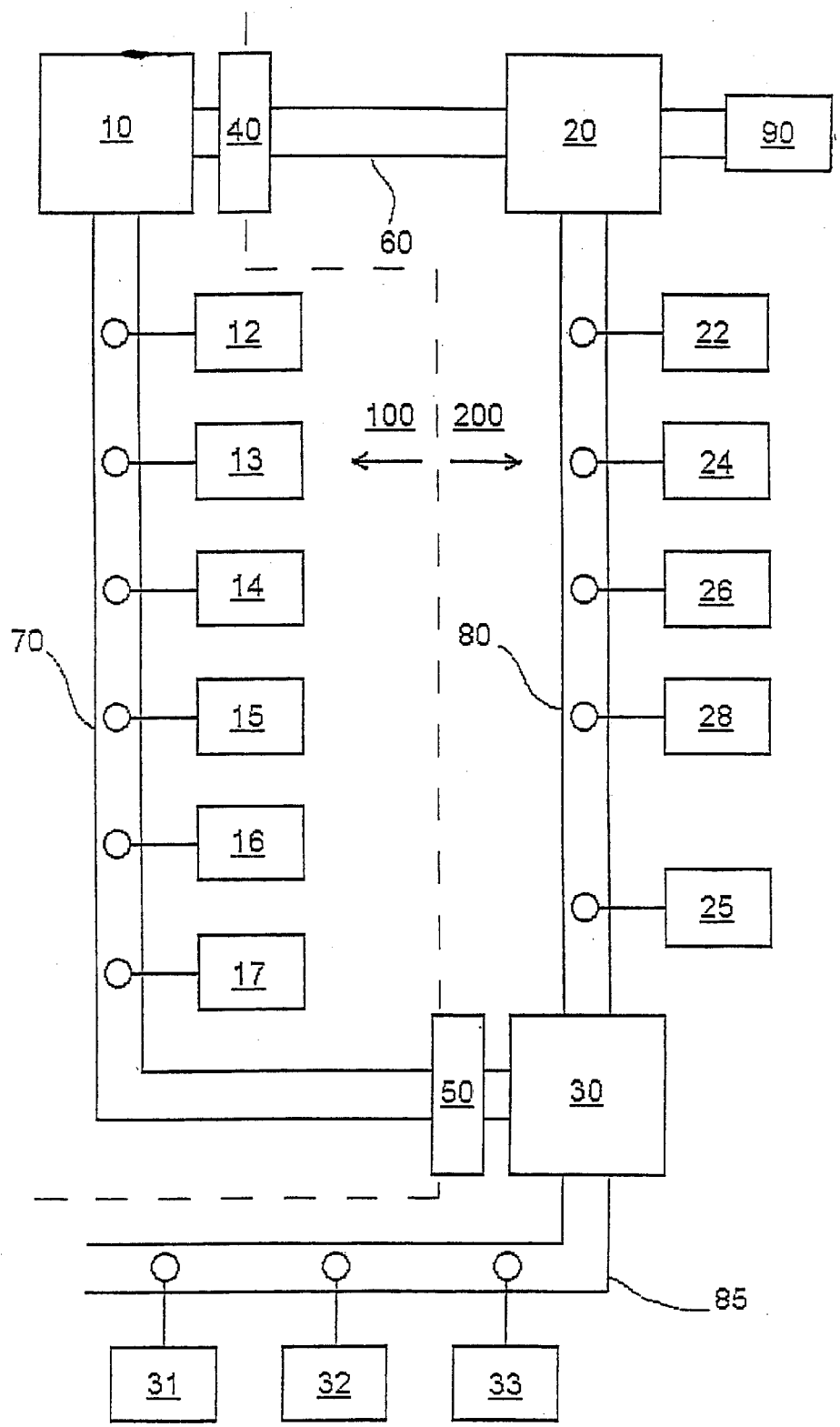

FIG. 1 shows by way of example the vehicle computer arrangement, that is to say, a segment of a vehicle computer arrangement according to the present invention.

The vehicle computer arrangement of the invention according to the present exemplary embodiment includes three computers 10, 20, 30, which are provided for processing different types of information; namely, a first computer 10 for processing vehicle-specific information, a second computer 20 for processing information of multimedia applications, and a third computer 30 for processing information of the so-called body electronics, thus, for example, of the central locking system, the sliding sunroof control, and an electrical seat- and mirror adjustment.

The three computers 10, 20, 30 of the present exemplary embodiment are interconnected via data and/or control buses 60, 70, 80, a first bus 60 connecting first and second computers 10, 20, a second bus 70 connecting first and third computers 10, 30, and a third bus 80 connecting second and third computers 20, 30 to one another. In addition, a fourth bus 85 is connected to the third computer.

The described buses are not only used to interconnect the at least two computers; rather, further components are connected to buses 60, 70, 80, 85 such as, for example, an engine management 12 connected to second bus 70, a broadcast-receiver component 22 connected to third bus 80 and, for instance, an electrical seat- and mirror adjustment 33 connected to fourth bus 85.

In addition, the vehicle computer arrangement shown in the FIGURE is provided with an interface 90 which enables the vehicle computer arrangement to communicate with external components such as, for example, a diagnostic unit located in a motor-vehicle service station and connected to the vehicle computer arrangement.

Finally, the vehicle computer arrangement shown in the present case is provided with a first and a second monitoring circuit 40 and 50, first monitoring circuit 40 being arranged between first computer 10 and second computer 20, and second monitoring circuit 50 being arranged between first computer 10 and third computer 30. First monitoring circuit 40 has the task of checking whether a data exchange between the first and the second computer is permitted for data processed or to be processed in the first or the second computer, and to block the data exchange in the event that it is not permitted for the monitored data. Analogously, second monitoring circuit 50, arranged between the first and the third computer, has the task of checking and, if applicable, preventing the data exchange between first and third computers 10, 30.

Further components 12 through 17 of a first group of further components connected to first bus 70 are, in detail:

an engine management 12 which in known manner, for example, as a function of the engine temperature, the engine speed, the load state of the engine and the air quantity that is necessary for the fuel combustion and is determined by an air-mass flow sensor, and optionally as a function of an output signal from a $\lambda$ probe determining the exhaust-gas composition, meters to the engine the ideal fuel quantity calculated with reference to a characteristics field stored in first computer 10; and which in known manner, for example, as a function of the load state of the engine and as a function of the output signals from a knock sensor, with the aid of further characteristics fields stored in computer 10, sets the ignition point that is ideal for the combustion process in the case of an Otto spark ignition engine;

a transmission-shift control 13 which, in the case of an automatic transmission, establishes the ideal switching points as a function of the load and speed data of the motor-vehicle engine; which, in the case of individual, slipping driven wheels, partially or completely blocks the differential along the lines of a traction control system (TCS); and which, for example, adapts to the driving habits of the motor-vehicle driver along the lines of an intelligent transmission-shift control to the effect that, for instance, if the motor-vehicle driver has a predominately sporty driving style, the switching points are shifted toward higher engine speeds, while if the driving style of the motor-vehicle driver is more conservative, the switching points are shifted toward lower speeds;

sensors 14, allocated to engine management 12 and transmission-shift control 13, such as a water-temperature and/or oil-temperature sensor, a load sensor for ascertaining the load state of the motor-vehicle engine, a knock sensor for determining whether a knocking combustion may be present, an air-mass flow sensor for determining the air quantity necessary for the combustion taking place in the engine, a $\lambda$ probe for determining the exhaust-gas composition, etc.;

a control 15 for an anti-lock braking system (ABS) which prevents the braked wheels from locking when the motor vehicle is braked;

a seat-belt-tightener control or airbag control 16 which, in the event of an accident, increases the effectiveness of the seat belt, and, in addition, deploys an airbag to protect the driver;

a further group of sensors 17 including, for example, wheel sensors for determining the stoppage of a wheel of the motor vehicle in response to a braking process, crash sensors for deploying the airbag in the event of an accident, etc.

First computer 10, to which described further components 12 through 17 are connected via bus 70, in addition to providing characteristics fields for, e.g., the fuel-quantity metering and for adjusting the ignition point and possibly for ascertaining the optimum values for the fuel rate and for adjusting the ignition point, is also used for handling the communication of the further components among each other. Thus, first computer 10 also regulates, inter alia, the transfer of data, necessary for determining the ignition point and the mixture preparation, from sensors 14 to engine management 12, that is to say, it reads the data from sensors 14, calculates therefrom, with the aid of the stored characteristics fields, the optimal values for the ignition point and the mixture metering, and makes them available to engine management 12. In the same way, first computer 10 also controls, for example, the communication of the ABS control unit with wheel sensors 17.

Components 22 through 28 connected to the second computer are, in detail:

- a broadcast-receiver component 22 for the reception of radio programs broadcast via broadcast transmitting frequencies, and optionally of additional information broadcast via the broadcast transmitting frequencies;
- a compact-disk player 24 in the form of a so-called CD changer, by which one compact disk is selected for playback from a plurality of compact disks inserted in the CD changer, and which makes reproducible audio signals available as output signal;
- a transceiver 26 in the form of a GSM mobile telephone; and
- a navigation unit 28 which, as a function of a predefined starting and destination location, data of a digitally stored map, and information about the current position of the motor-vehicle which with the aid of a GPS (Global Positioning System) receiver, furthermore the ABS wheel sensors 17 and possibly of a compass, determines the current vehicle position in the context of the digitally stored map, and from this, determines guidance information for guiding the motor-vehicle driver;
- a display unit 25 which is used, first of all, for reproducing vehicle-specific information such as the instantaneous travel speed, mileage, engine speed, fuel-tank level and similar information, as well as information such as the currently received broadcast transmitting frequency or the received radio program set on broadcast receiver 22, the currently selected compact disk in CD changer 24 or the current play-back title of a specific compact disk, functions of the GSM telephone, and possibly for the display of guidance information of navigation unit 28.

Finally, third computer 30 is used for processing information relating to the so-called body electronics. Further components 31 through 33 connected to fourth bus 85 are, in detail:

- a control 31 for the central locking system;
- a control 32 for the electric sunroof of the vehicle which, for example, closes an open sunroof automatically when shutting off the engine; and
- an interior and exterior mirror adjustment 33, as well as an electrical seat adjustment for adapting various functions and elements which are in need of adjustment to the individual requirements of the respective motor-vehicle driver, provision being made in the present example for using control 33 to automatically adjust the diverse functions and elements to the respective driver after his/her identification by the motor-vehicle computer arrangement.

In a first exemplary embodiment of the vehicle computer arrangement according to the present invention, described interface 90 is a so-called chip-card reader into which an information-bearing chip card, e.g. in the form of the Key Card known from Blaupunkt Autoradios, can be inserted. After the chip card has been inserted into chip-card reader 90, second computer 20, to which chip-card reader 90 is connected in the present exemplary embodiment, reads information from the chip card and, in the example of the aforementioned Key Card, supplies it to broadcast-receiver component 22 for identifying the user and possibly for releasing the broadcast receiver for use. In addition, the information stored on the chip card for identifying the user is routed to third computer 30 from whose memory user-specific information for the seat and mirror adjustment, which the identified user had set upon leaving the motor vehicle, is read out and routed to seat and mirror adjustment 33 for adjusting the seat and the mirrors.

However, it is equally possible that the user-specific information, such as the seat and mirror adjustment, a favorite radio program or a personal telephone-number list for the GSM telephone, is not stored in the second and third computers, i.e. components 22 through 28 and 31 through 33 connected to these computers, but rather that upon shutting off the vehicle, this information is written into a memory of the chip card inserted into chip-card reader 90, and upon renewed start-up of the vehicle computer arrangement, is read out from the chip card.

In a further exemplary embodiment, the chip card inserted into chip-card reader 90 is used not only to identify the user and possibly to store user-specific data, but is also used to update and/or supplement components of the operating program of one of computers 10, 20, 30 and/or other parts of the vehicle computer arrangement or of further components 12, 13, 14, 15, 16, 17, 22, 24, 25, 26, 28, 31, 32, 33 connected to one of computers 10, 20, 30. To that end, in the vehicle computer arrangement according to the present invention, the second computer, possibly after checking the authorization of the chip card inserted into chip-card reader 90, reads out operating-program components from the chip card and supplies them to the affected parts of the vehicle computer arrangement or to further components for updating and/or supplementing their operating programs.

In the same way, it is also provided that, for example, for the purpose of error diagnosis in an authorized motor-vehicle service station, information of the vehicle computer arrangement is read out from said vehicle computer arrangement with the aid of interface 90 and is further processed. In the present exemplary embodiment, the information read out from the vehicle computer arrangement via the chip-card reader, which here is also simultaneously designed as a chip-card write device, is written into a memory of the chip card inserted into chip-card reader 90.

The present exemplary embodiment also provides, for example, for the last seat and mirror setting, as well as the radio program last listened to and a personal telephone book of the user of the motor-vehicle arrangement to be written into the memory of the chip card, inserted into chip-card reader 90, at the time of, or shortly prior to, leaving the vehicle. This process is initiated, for instance, by switching off the ignition of the motor vehicle.

In a further exemplary embodiment of the vehicle computer arrangement according to the present invention, interface 90 is in the form of a compact disk reading unit, so that by evaluating data stored on a compact disk inserted into compact disk reading unit 90, the operating program of the vehicle computer arrangement, parts of the vehicle computer arrangement or further components 12 through 33 connected to one of computers 10, 20, 30, can be partially or completely exchanged or updated. The procedure for updating the operating programs by data stored on a CD-ROM inserted into the compact disk reading unit is carried out in the same manner as is customary, for example, in today's personal computers.

In another exemplary embodiment of the vehicle computer arrangement according to the present invention, interface 90 is implemented in the form of a transceiver 26, particularly a GSM mobile telephone 26, connected as a further component to one of the at least two computers. In this case, after establishing a radio link between transceiver 26 and an external data supplier, data sent by the data supplier are received by transceiver 26 in order to change and/or update parts of the operating program of the vehicle computer arrangement, parts of the vehicle computer arrangement or further components 12 through 31 connected to one of the at least two computers. In this context, data is first transmitted from the data supplier to the transceiver, and from there to the vehicle computer arrangement, after a request by the vehicle computer arrangement. However, it is equally possible for a data transmission from the data supplier to the vehicle computer arrangement to be initiated by the data supplier, e.g. by a motor-vehicle manufacturer. For example, this is useful when, after delivering a specific group of vehicle computer arrangements, the motor-vehicle manufacturer has discovered errors in their operating programs, or at least operating-program components in need of improvement, which can be improved and/or updated by this measure. In the same way, however, it is also possible to route information via the transceiver 26/data supplier radio link to the data supplier, in this case, for example, a motor-vehicle service station, thus easily enabling a remote diagnosis of the motor vehicle while it is in operation on the basis, for instance, of the vehicle data ascertained by sensor groups 14 and 17. In response to the appearance of malfunctions, for example, the motor-vehicle service station can then automatically send a warning via the data supplier/ transceiver 26 radio link to the vehicle computer arrangement, and therefore to the motor-vehicle driver, which informs them about possible malfunctions of the motor vehicle or of the motor-vehicle computer arrangement, or an imminent service-station stop.

In a further exemplary embodiment of the present vehicle computer arrangement, interface 90 is realized through a radio receiver 22, particularly a broadcast receiver, connected as a further component to one of the computers of the vehicle computer arrangement, data being received by the transceiver as radio signals for changing and/or updating parts of the operating program of the vehicle computer arrangement, of parts of the computer vehicle arrangement or of further components 12 through 31 connected to one of the computers. The information received by radio receiver 22 is, for example, digitally coded traffic-announcement information, transmitted over a broadcast transmitting frequency within the so-called Traffic Message Channel (TMC) of the Radio Data System (RDS), which, for instance, navigation unit 28 can take into account during route planning and the corresponding guidance of the motor-vehicle driver.

In the case of the present vehicle computer arrangement, the architecture of computers 10, 20, 30 of the vehicle computer arrangement according to the present invention is advantageously in the form of standard personal computers, and furthermore, the information processing in computers 10, 20, 30, as well as the data exchange of computers 10, 20, 30 among themselves and with further components 12 through 31 connected to the computers is carried out by way of a standard operating system. In addition to excellent availability of the components, particularly of the computers for the vehicle computer arrangement, the effect of this is that a widespread and generally accepted standard is provided for the operating programs of the vehicle computer arrangement, so that motor-vehicle manufacturers as well as suppliers can fall back upon a uniform operating system when producing further components 12 through 33 as well as when creating the necessary operating programs for the vehicle computer arrangement and/or further components 12 through 33 connected to it.

Alternatively thereto, however, various computers of the vehicle computer arrangement can also be provided with other than a standard personal-computer architecture. In the present exemplary embodiment, in which computers 10, 20, 30 have a standard PC architecture, bus systems 60, 70, 80, 85 shown in the FIGURE are bus systems of type 1394, known from the PC sector, which is a broadband, serial bus system, customary in the industry, that is preferably used in PC consumer devices for multimedia applications. Another bus system utilized is the USB (Universal Serial Bus), a standard likewise coming from the PC industry for a serial bus system having a smaller bandwidth compared to the 1394. However, it is equally possible for at least one part of computers 10 through 30 to be interconnected via a CAN bus or a related-bus known from the motor-vehicle industry.

In the present exemplary embodiment of the vehicle computer arrangement according to the present invention, provision is now made for a first monitoring circuit 40, arranged between first computer 10 and second computer 20, which checks whether a data exchange between the first and the second computer is permitted for data processed or to be processed in the first or the second computer, and which blocks the data exchange in the event that it is not permitted for the monitored data. A corresponding monitoring circuit 50 is also arranged between first computer 10, i.e. further components 12–17 connected to first computer 10, and third computer 30 for the body electronics. This is based on the consideration that the information processed by the various computers must satisfy different safety requirements, so that an uncontrolled access by one of computers 20 or 30 to the safety-critical information processed by first computer 10 is effectively prevented.

Therefore, the information processed in first computer 10 relates to safety-critical requirements such as engine management 12 and transmission-shift control 13, as well as the ABS/TCS control or a seat-belt tightener and airbag control, thus all such information and functions whose malfunction or uncontrolled manipulation can have consequences adversely affecting the safety of the motor vehicle or of the motor-vehicle driver. Therefore, monitoring circuits 40 and 50 of the vehicle computer arrangement shown in FIG. 1 screen off the safety-critical region (first computer 10, further components 12 through 17 and second bus 70) of the vehicle computer arrangement according to the present invention vis-à-vis the relatively open region including second computer 20, third computer 30, further components 22 through 28 and 31 through 33, as well as third bus 80 and fourth bus 85, from external access via interface 90.

On the other hand, however, it is also necessary that a controlled communication be possible between safety-relevant region 100 and relatively freely accessible region 200. Thus, for example, information of the engine management or transmission-shift control and of sensor groups 14 and 17, as well as, for instance, information of the seat-belt-tightener and airbag control 16 is transmitted from safety-critical region 100 to second computer 20 via first monitoring circuit 40. An example for such information is, for instance, the sensor signals from sensors 17 containing information that is necessary for seat-belt-tightener/airbag control 16 and indicates that the motor vehicle has or is about to collide with an obstruction. In the event of an accident of the affected motor vehicle, in the present exemplary embodiment, this information is routed via first computer 10, first monitoring circuit 40 and second computer 20 to transceiver 26, via which an emergency call is automatically initiated, for instance, at the nearest police station. In the same way, data, for example, of engine-management and transmission-shift-control sensors 14, such as the gear just engaged, the prevailing coolant temperature or oil temperature of the engine, the instantaneous fuel consumption or similar information is supplied for display to display unit 25 connected to second computer 20 via third bus 80.

For the application cases described, it is initially sufficient that described monitoring circuits 40 and 50 completely block a data exchange from the second or third computer to the first computer, and permit a data exchange from the first to the second or third computer for at least a part of the information. This means that, in a first exemplary embodiment of the vehicle computer arrangement according to the present invention, monitoring circuits 40, 50 can be selectively transmissive unidirectionally. The demand for selective transmissivity of the monitoring circuits follows, for example, from the fact that the readout of, for instance, engine-specific characteristics fields, such as an injection-quantity or an ignition-point characteristics field, should not be possible by an unauthorized user.

However, at this point to permit, for example, the motor-vehicle manufacturer to rework, exchange or supplement the safety-critical operating programs processed in first computer 10, a further exemplary embodiment provides that monitoring circuits 40 and 50 are disconnectible by, for instance, the motor-vehicle manufacturer or another authorized person or service station. In this manner, information can also be transmitted from interface 90 via second computer 20 and first bus 60 to first computer 10, and likewise via third computer 30 and second bus 70 to first computer 10. In this context, monitoring devices 40 and 50 can be disconnected, as in the present case, by a separate control line connected to the monitoring circuits, as well as, for example, by a software design approach, for example, by a code word protection. In the last case, for instance, the monitoring circuits would only be transmissive for such data which is preceded by a specific header having a predefined code word.

As already indicated, in the present exemplary embodiment, a first protected region 100 of the vehicle computer arrangement is provided for processing safety-critical and vehicle-specific data, preferably for the control of functions and/or aggregates of the motor vehicle and/or for acquiring vehicle-specific information. In addition, a further region, including second computer 20, third bus 80 and further components 22 through 28 connected to them, is provided preferably for processing information of multimedia applications, particularly data of a broadcast receiver 22, further audio signal sources 24, a mobile telephone 26 and a navigation device 28. Finally, a third computer, likewise allocated to unprotected region 200, is provided for processing information of the body electronics, namely of control units, in the form of further components connected to fourth bus 85, for central locking system 31, sunroof 32 and seat and mirror adjustment 33.

Consequently, a division of the operating programs for the vehicle computer arrangement is achieved, to the effect that a first part of the operating programs, namely, the operating programs provided for first protected region 100, is only accessible for an authorized group of people, particularly the motor-vehicle manufacturer, along the lines of an update or a readout of the operating programs, while a second unprotected or only partially protected region 200 is also accessible for supplier or service firms, or even the owner of the motor vehicle.

In this context, the operating programs are preferably divided according to the criterion of safety-critical and vehicle-proprietary, respectively, and of multimedia and FIS (Driver Information System) applications which are not or are to a limited extent safety-critical and are not vehicle-proprietary. An example for the last-indicated applications would be, for instance, a scheduler, computer games, word processing or possibly even an Internet access.

While in the present exemplary embodiment, it is suggested to divide the operating programs or the vehicle computer arrangement into a first safety-critical region and a second region which is not safety-critical or is safety-critical only to a limited extent, it is, however, also possible to divide the vehicle computer arrangement or the operating programs according to other criteria, for example, real-time critical applications and those which are not real-time critical.

Although in FIG. 1, first and second monitoring circuits 40 and 50 are shown as separate circuits, in the present exemplary embodiment they are preferably integrated into first computer 10 and third computer 30, respectively, and are implemented in them in the form of software.

What is claimed is:

1. A vehicle computer arrangement comprising:
    at least two computers;
    at least one data bus via which the at least two computers are interconnected; and
    a monitoring circuit situated between a first and a second of the at least two computers; wherein
        the monitoring circuit checks whether a data exchange between the first computer and the second computer is permitted for at least one of data processed and data to be processed in at least one of the first computer and the second computer, and
        the monitoring circuit blocks the data exchange in the event the data exchange is not permitted for the monitored data.

2. The vehicle computer arrangement as recited in claim 1, wherein:
    more than two computers are interconnected via data buses in such a way that each of the more than two computers is connected to at least one other of the more than two computers; and
    monitoring circuits for checking and possibly blocking the data exchange between the interconnected computers are situated in at least one subset of the interconnections between the more than two computers.

3. The vehicle computer arrangement as recited in claim 1, wherein the monitoring circuit is integrated into one of the at least two interconnected computers.

4. The vehicle computer arrangement as recited in claim 1, wherein the monitoring circuit is disconnectible, so that after disconnecting the monitoring circuit, a data exchange is possible between the first and the second of the at least two computers for the data which are blocked by the monitoring circuit for the exchange between the first computer and the second computer.

5. The vehicle computer arrangement as recited in claim 1, further comprising:
    at least one interface for communication of the vehicle computer arrangement with at least one external component;
    wherein at least one of the monitoring circuit and a further monitoring circuit is situated between the at least one interface and at least one of the at least two computers.

6. The vehicle computer arrangement as recited in claim 5, wherein:
    the interface includes a compact disk reader unit;
    the compact disk reader unit evaluating data stored on a compact disk inserted in the compact disk reader unit; and the data used for at least one of completely exchanging, partially exchanging, and updating, at least one of:
- the operating program of the vehicle computer arrangement;
- a part of the vehicle computer arrangement; and
- a further vehicle component connected to one of the at least two computers.

7. The vehicle computer arrangement as recited in claim 5, wherein:
- the interface is implemented by a transceiver connected as a further component to one of the at least two computers; and
- the transceiver is able to receive data sent by a data supplier after establishing a radio link between the transceiver and the data supplier for at least one of changing and updating at least one of:
  - a part of the operating program of the vehicle computer arrangement;
  - a part of the vehicle computer arrangement; and
  - a further vehicle component connected to one of the at least two computers.

8. The vehicle computer arrangement as recited in claim 5, wherein:
- the interface is implemented by a radio receiver connected as a further component to one of the at least two computers; and
- the radio receiver is able to receive data as radio signals for at least one of changing and updating at least one of:
  - a part of the operating program of the vehicle computer arrangement;
  - a part of the vehicle computer arrangement; and
  - a further component connected to one of the at least two computers.

9. The vehicle computer arrangement as recited in claim 5, wherein:
- the interface is implemented by a chip-card reader; and
- data from a chip card inserted into the chip-card reader is able to be evaluated for at least one of changing and updating at least one of:
  - a part of the operating program of the vehicle computer arrangement;
  - a part of the vehicle computer arrangement; and
  - a further component connected to one of the at least two computers.

10. The vehicle computer arrangement as recited in claim 1, wherein at least one first computer of the at least two computers is provided for at least one of:
- processing vehicle-specific data;
- controlling at least one of functions and vehicle units; and acquiring vehicle-specific information.

11. The vehicle computer arrangement as recited in claim 1, wherein at least one first computer of the at least two computers is:
- provided for processing vehicle-specific data; and
- connected to further components, including at least one of:
  - control units for controlling functions and vehicle units;
  - sensing devices for acquiring vehicle-specific information; and
  - display instruments for displaying operating data of the vehicle.

12. The vehicle computer arrangement as recited in claim 1, wherein at least one second computer of the at least two computers is provided for processing data of multimedia applications, including at least one of:
- data of a broadcast receiver;
- a further audio signal source;
- a mobile telephone; and
- a navigation device.

13. The vehicle computer arrangement as recited in claim 1, wherein:
- at least one of the at least two computers is a personal computer; and
- at least one subset of the at least two computers communicates at least among themselves and with at least one of a further vehicle component with the aid of an operating system provided for a personal computer.

14. The vehicle computer arrangement as recited in claim 1, wherein:
- the monitoring circuit blocks all data exchanges from the second computer to the first computer.

15. The vehicle computer arrangement as recited in claim 14, wherein:
- the monitoring circuit allows an exchange of at least a portion of data from the first computer to the second computer.

* * * * *